United States Patent
Burke

(10) Patent No.: US 11,283,390 B2
(45) Date of Patent: Mar. 22, 2022

(54) CONTROLLER FOR AN ELECTRIC MACHINE

(71) Applicant: PROTEAN ELECTRIC LIMITED, Farnham (GB)

(72) Inventor: Richard Burke, Farnham (GB)

(73) Assignee: PROTEAN ELECTRIC LIMITED, Farnham (GB)

( * ) Notice: Subject to any disclaimer, the term of this patent is extended or adjusted under 35 U.S.C. 154(b) by 0 days.

(21) Appl. No.: 16/618,214

(22) PCT Filed: May 29, 2018

(86) PCT No.: PCT/GB2018/051450
§ 371 (c)(1),
(2) Date: Nov. 29, 2019

(87) PCT Pub. No.: WO2018/220354
PCT Pub. Date: Dec. 6, 2018

(65) Prior Publication Data
US 2020/0119682 A1    Apr. 16, 2020

(30) Foreign Application Priority Data
May 30, 2017 (GB) .................................... 1708594

(51) Int. Cl.
*H02P 29/024* (2016.01)
*H02P 27/08* (2006.01)

(52) U.S. Cl.
CPC ............ *H02P 29/027* (2013.01); *H02P 27/08* (2013.01)

(58) Field of Classification Search
CPC ......... H02P 29/024; H02P 27/06; H02H 7/08; H02H 7/122; H02M 7/5387
See application file for complete search history.

(56) References Cited

U.S. PATENT DOCUMENTS 5,687,049 A * 11/1997 Mangtani ............. H02H 7/1227
361/18
8,796,972 B2 * 8/2014 Wichert ................ H02P 29/032
318/400.3
(Continued)

FOREIGN PATENT DOCUMENTS

EP    3217537 A1    9/2017
GB    2309597 A     7/1997
(Continued)

OTHER PUBLICATIONS

PCT Notification of Transmittal of International Search Report and The Written Opinion of the International Searching Authority dated Sep. 7, 2018, issued from the International Searching Authority in related PCT Application No. PCT/GB2018/051450 (8 pages).
(Continued)

*Primary Examiner* — Said Bouziane
(74) *Attorney, Agent, or Firm* — Nolte Lackenbach Siegel

(57) ABSTRACT

A controller for an electric motor system including a three phase bridge inverter having a plurality of high side switches and a plurality of low side switches, the controller comprising means arranged upon detection of a fault in one of the high side switches to place the remaining high side switches in a closed circuit configuration and the plurality of low side switches in an open circuit configuration and upon detection of a fault in one of the low side switches to place the remaining low side switches in a closed circuit configuration and the plurality of high side switches in an open circuit configuration to allow coil windings of an electric motor to be placed in a short circuit configuration.

6 Claims, 9 Drawing Sheets

(56) References Cited

U.S. PATENT DOCUMENTS

| | | | |
|---|---|---|---|
| 2008/0129238 A1* | 6/2008 | Andersen | H02H 3/162 |
| | | | 318/565 |
| 2009/0096394 A1* | 4/2009 | Taniguchi | H02P 29/032 |
| | | | 318/400.09 |
| 2011/0248657 A1 | 10/2011 | Endoh | |
| 2011/0309777 A1 | 12/2011 | Welchko et al. | |
| 2017/0282968 A1* | 10/2017 | Kezobo | H02P 27/06 |
| 2018/0236874 A1* | 8/2018 | Tsukada | B60L 3/0007 |

FOREIGN PATENT DOCUMENTS

| | | |
|---|---|---|
| GB | 2540602 A | 1/2017 |
| WO | 2009125683 A1 | 10/2009 |

OTHER PUBLICATIONS

GB Search Report dated Nov. 17, 2017, issued from the GB Intellectual Property Office in related GB Application No. GB1708594.5. (2 pages).

* cited by examiner

CONTROLLER FOR AN ELECTRIC MACHINE

CROSS REFERENCE TO RELATED APPLICATION

This application is a U.S. National Stage Patent Application based on PCT No. PCT/GB2018/051450, filed May 29, 2018, claiming priority to GB Application No. 1708594.5, filed on May 30, 2017, the entire contents of which are hereby incorporated by reference as though fully set forth herein.

The present invention relates to a controller, in particular a controller for an electric machine.

Electric motors work on the principle that a current carrying wire will experience a force when in the presence of a magnetic field. When the current carrying wire is placed perpendicular to the magnetic field the force on the current carrying wire is proportional to the flux density of the magnetic field. Typically, in an electric motor the force on a current carrying wire is formed as a rotational torque.

A three phase electric motor typically includes three coil sets, where each coil set is arranged to generate a magnetic field associated with one of the three phases of an alternating voltage.

To increase the number of magnetic poles formed within an electric motor, each coil set will typically have a number of coil sub-sets that are distributed around the periphery of the electric motor, which are driven to produce a rotating magnetic field.

By way of illustration, FIG. 1 shows a typical three phase electric motor 10 having three coil sets 14, 16, 18. Each coil set consists of four coil sub-sets that are connected in series, where for a given coil set the magnetic field generated by the respective coil sub-sets will have a common phase.

The three coil sets of a three phase electric motor are typically configured in either a delta or wye configuration.

A control unit for a three phase electric motor having a DC power supply will typically include a three phase bridge inverter that generates a three phase voltage supply for driving the electric motor. Each of the respective voltage phases is applied to a respective coil set of the electric motor.

A three phase bridge inverter includes a number of switching devices, for example power electronic switches such as Insulated Gate Bipolar Transistor (IGBT) switches, which are used to generate an alternating voltage from a DC voltage supply.

If a fault is identified in the inverter, typically the electric motor is disabled by placing the inverter switches in an open circuit, non-switching configuration. However, depending on the nature of the inverter fault, this switch configuration can result in the electric motor experiencing torque ripple resulting from back electromotive force generated by the disabled motor and the electric motor can generate noise.

It is desirable to improve this situation.

In accordance with an aspect of the present invention there is provided a controller and method according to the accompanying claims.

The present invention as claimed has the advantage of allowing a motor to be disabled following an inverter fault without the electric motor experiencing torque ripple and without the fault causing the electric motor to generate acoustic noise that may result from torque ripple.

The present invention will now be described, by way of example, with reference to the accompanying drawings, in which.

The embodiment of the invention described is for a controller for controlling the configuration and operation of an inverter following the inverter experiencing a fault, where the inverter is arranged to control current within coil windings of an electric motor. For the purposes of the present embodiment the electric motor is for use in a wheel of a vehicle, however the electric motor may be located anywhere within the vehicle. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. As such, the definition of electric motor is intended to include electric generator. In addition, some of the aspects of the invention are applicable to an arrangement having the rotor centrally mounted within radially surrounding coils. As would be appreciated by a person skilled in the art, the present invention is applicable for use with other types of electric motors.

Figure 1:
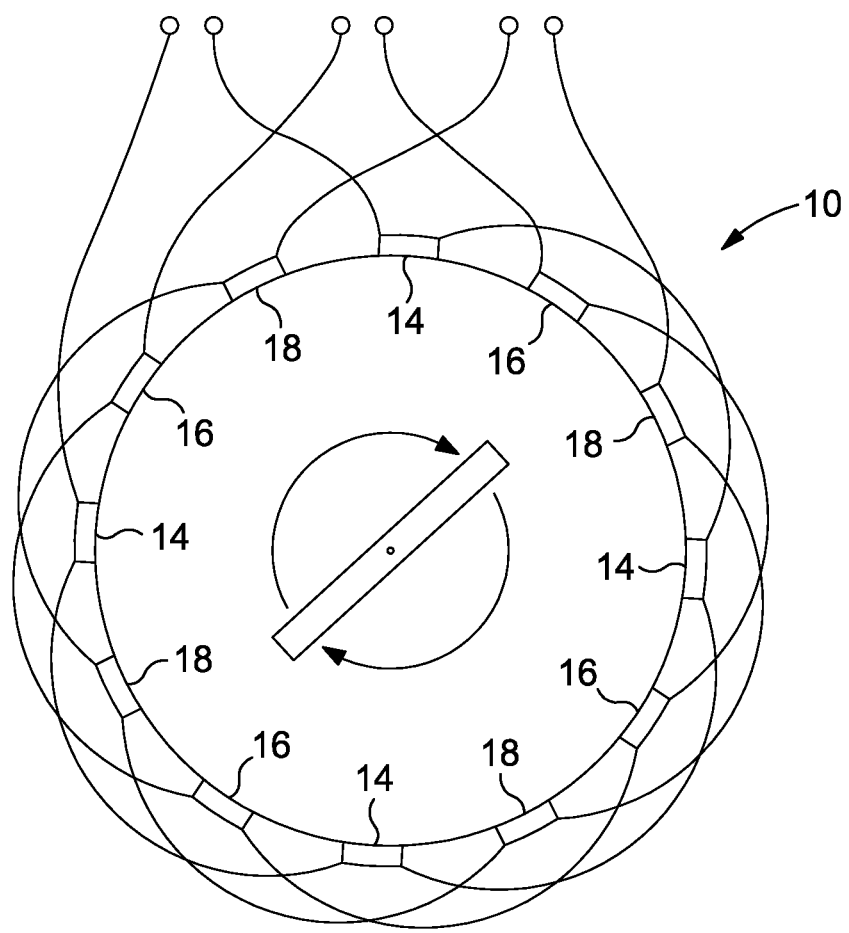
FIG. 1 illustrates a prior art electric motor.
Figure 2:
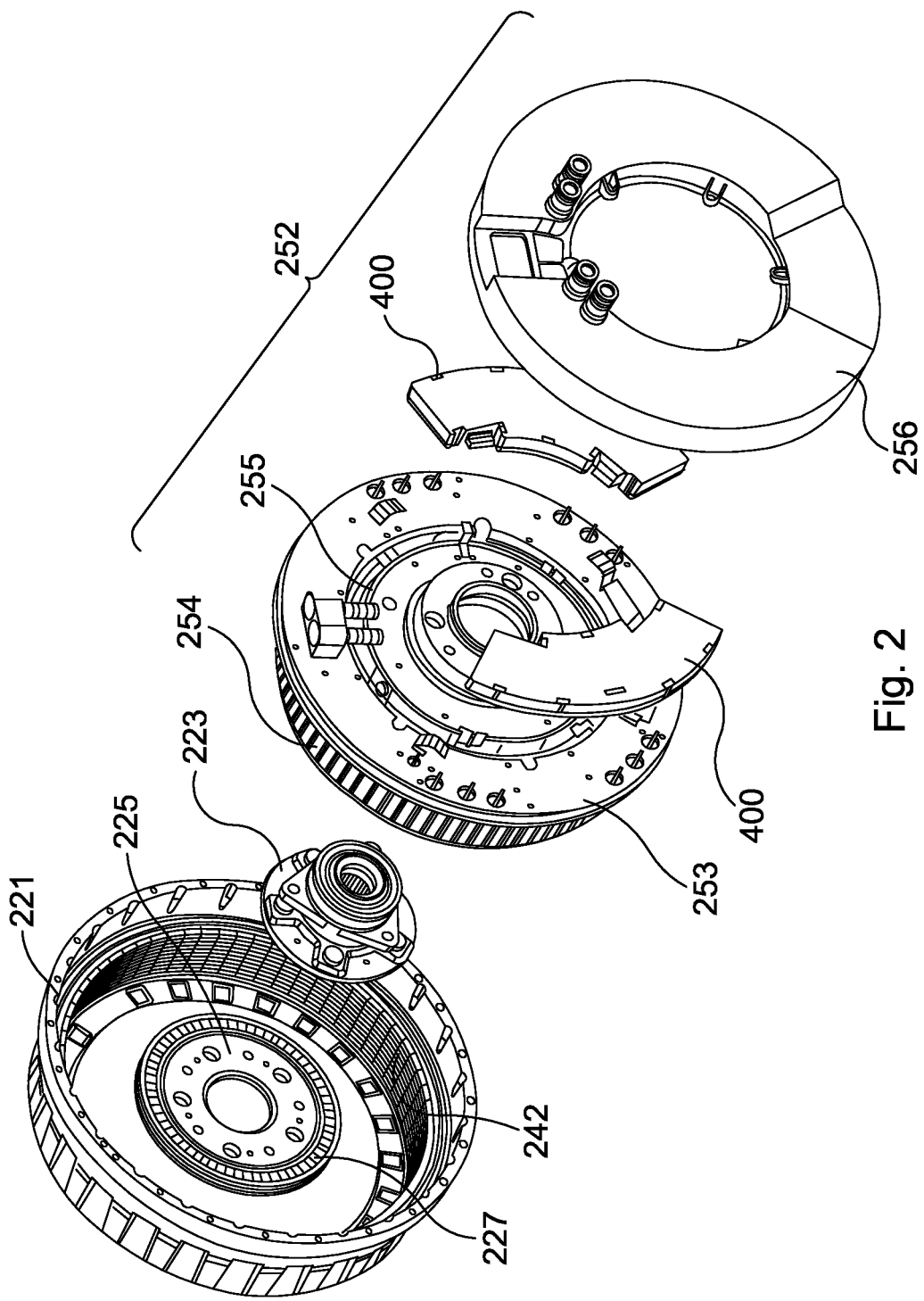
FIG. 2 illustrates an exploded view of a rotor according to an embodiment of the present invention.
Figure 3:
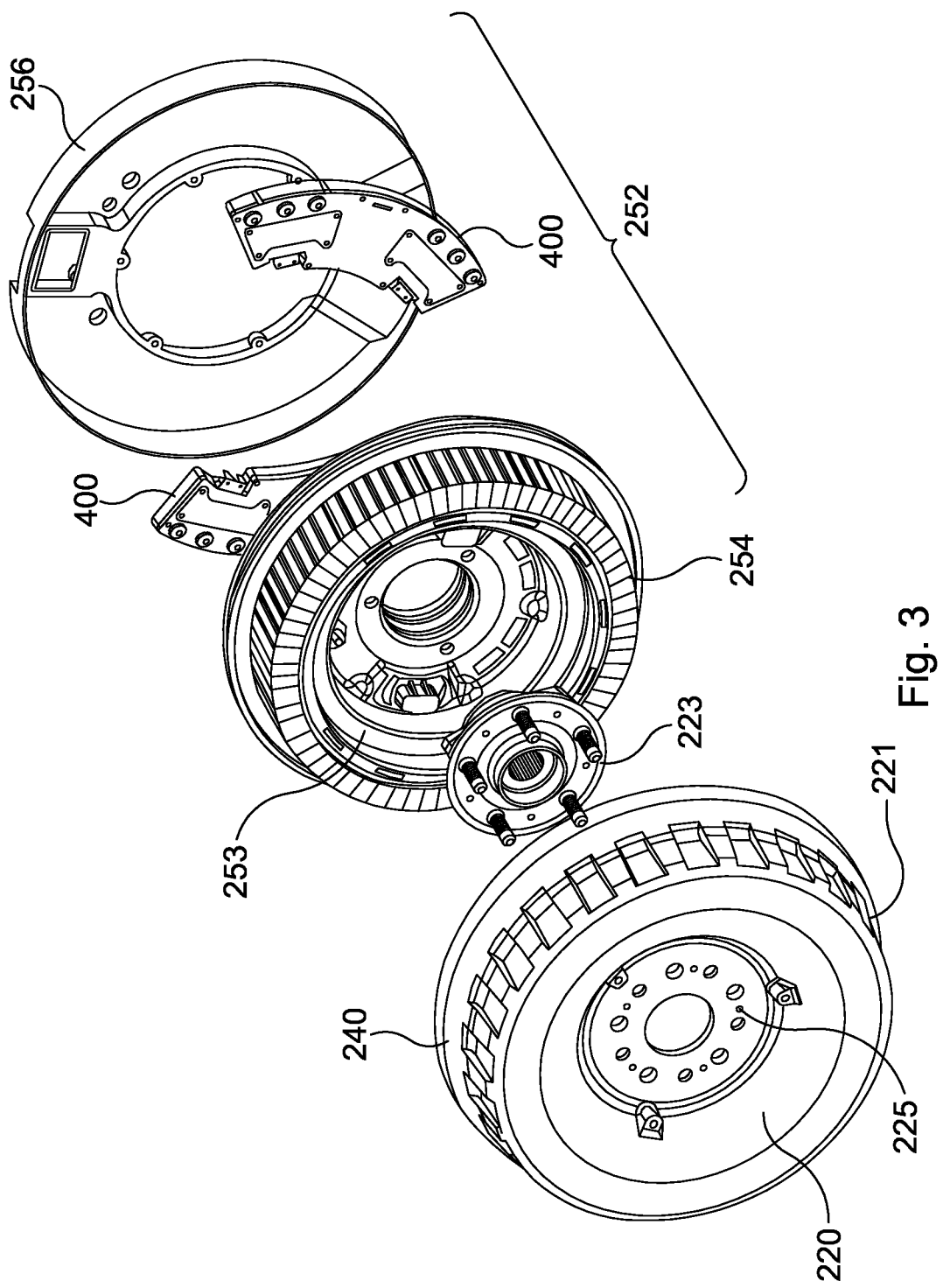
FIG. 3 illustrates a rotor according to an embodiment of the present invention.

For the purposes of the present embodiment, as illustrated in FIG. 2 and FIG. 3, the in-wheel electric motor includes a stator 252 comprising a heat sink 253, multiple coils 254, two control devices 400 mounted on the heat sink 253 on a rear portion of the stator for driving the coils, and an annular capacitor, otherwise known as a DC link capacitor, mounted on the stator within the inner radius of the control devices 400. The coils 254 are formed on stator tooth laminations to form coil windings. A stator cover 256 is mounted on the rear portion of the stator 252, enclosing the control devices 400 to form the stator 252, which may then be fixed to a vehicle and does not rotate relative to the vehicle during use.

Figure 4:
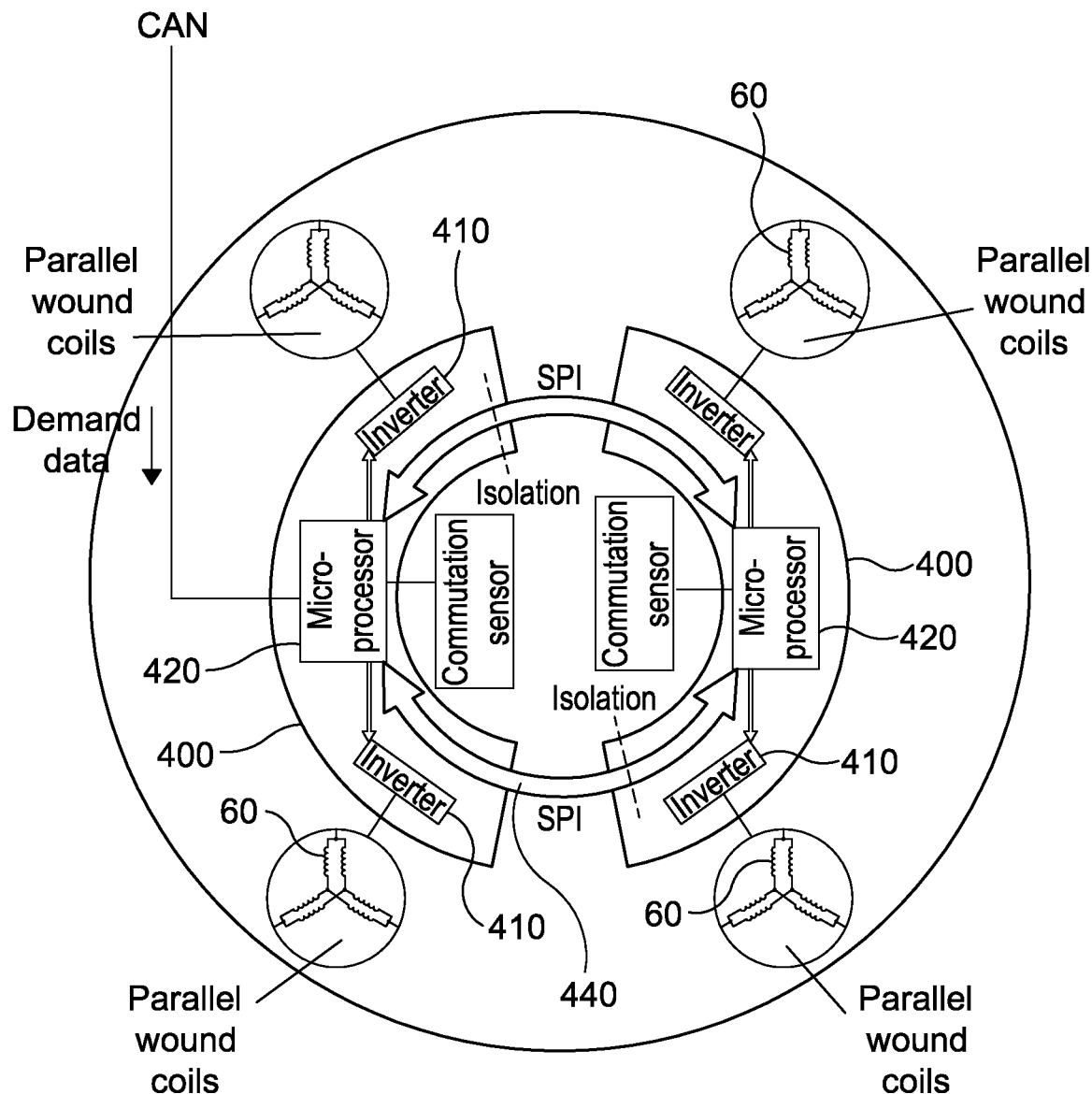
FIG. 4 illustrates a control device according to an embodiment of the present invention.

Each control device 400 includes two inverters 410 and control logic 420, which in the present embodiment includes a processor, for controlling the operation of the inverters 410, which is schematically represented in FIG. 4.

Although for the purposes of the present embodiment the in-wheel electric motor includes two control devices, where each control device includes control logic, in other words a controller, for controlling the operation of an inverter, any configuration of control logic and inverter combination may be used, including placing the control logic and/or inverters remote to the electric motor.

The annular capacitor is coupled across the inverters 410 and the electric motor's DC power source for reducing voltage ripple on the electric motor's power supply line, otherwise known as the DC busbar, and for reducing voltage overshoots during operation of the electric motor. For reduced inductance the capacitor is mounted adjacent to the control devices 400.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

FIG. 3 shows an exploded view of the same motor assembly illustrated in FIG. 2 from the opposite side. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor.

For improved position detection, preferably the sensor includes an associated second sensor placed 90 electrical degrees displaced from the first sensor.

In the present embodiment the electric motor includes four coil sets with each coil set having three coil sub-sets that are coupled in a wye configuration to form a three phase sub-motor, resulting in the motor having four three phase sub-motors. The operation of the respective sub-motors is controlled via one of the two control devices 400, as described below. However, although the present embodiment describes an electric motor having four coil sets (i.e. four sub motors) the motor may equally have one or more coil sets with associated control devices. In a preferred embodiment the motor includes eight coil sets 60 with each coil set having three coil sub-sets that are coupled in a wye configuration to form a three phase sub-motor, resulting in the motor having eight three phase sub-motors. Similarly, each coil set may have any number of coil sub-sets, thereby allowing each sub-motor to have two or more phases.

FIG. 4 illustrates the connections between the respective coil sets 60 and the control devices 400, where a respective coil set 60 is connected to a respective three phase inverter 410 included on a control device 400 for controlling current flow within the respective coil sets. Each of the respective three phase inverters contain six switches configured in a three phase arrangement having three high side switches and three low side switches, as described below, where a three phase alternating voltage may be generated by the controlled operation of the six switches. However, the number of switches will depend upon the number of voltage phases to be applied to the respective sub motors, where the sub motors can be constructed to have any number of phases.

Figure 5:
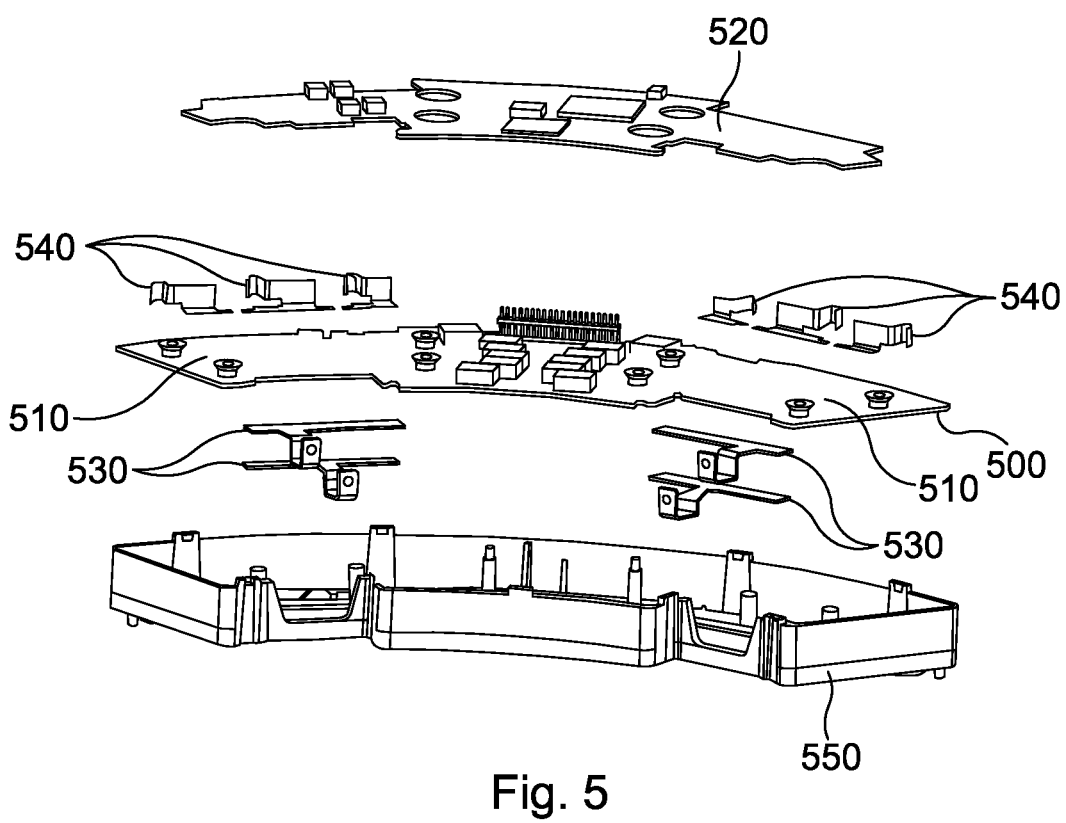
FIG. 5 illustrates an exploded view of a control device according to an embodiment of the present invention.

Preferably, the control devices 400 are of a modular construction. FIG. 5 illustrates an exploded view of a preferred embodiment, where each control device 400, otherwise known as a power module, includes a power printed circuit board 500 in which are mounted two power substrate assemblies 510, a control printed circuit board 520, four power source busbars 530 for connecting to a DC battery, and six phase winding busbars 540 for connecting to respective coil windings. Each of the control device components are mounted within a control device housing 550 with the four power source busbars 530 being mounted on an opposite side of the control device housing 550 to the phase winding busbars 540.

Each power substrate 510 is arranged to be mounted in a respective aperture formed in the power printed circuit board 500.

The power printed circuit board 500 includes a variety of components that include drivers for the inverter switches formed on the power substrate assemblies 510, where the drivers are typically used to convert control signals into a suitable form to turn the inverter switches on and off.

The control printed circuit board 520 includes a processor for controlling the operation of the inverter switches. Additionally, each control printed circuit board 520 includes an interface arrangement to allow communication between the respective control devices 400 via a communication bus with one control device 400 being arranged to communicate with a vehicle controller mounted external to the electric motor. The processor 420 on each control device 400 is arranged to handle communication over the interface arrangement.

As stated above, the processors 420 on the respective control devices 400 are arranged to control the operation of the inverter switches mounted on the respective power substrates 520 within the control housing 550, thereby allowing each of the electric motor coil sets 60 to be supplied with a three phase voltage supply resulting in the respective coil sub-sets generating a rotating magnetic field. As stated above, although the present embodiment describes each coil set 60 as having three coil sub-sets the present invention is not limited by this and it would be appreciated that each coil set 60 may have one or more coil sub-sets.

Under the control of the respective processors 420, each three phase bridge inverter 410 is arranged to provide pulse width modulation PWM voltage control across the respective coil sub-sets, thereby generating a current flow in the respective coil sub-sets for providing a required torque by the respective sub-motors.

PWM control works by using the motor inductance to average out an applied pulse voltage to drive the required current into the motor coils. Using PWM control an applied voltage is switched across the motor windings. During the period when voltage is switched across the motor coils, the current rises in the motor coils at a rate dictated by their inductance and the applied voltage. The PWM voltage control is switched off before the current has increased beyond a required value, thereby allowing precise control of the current to be achieved.

For a given coil set 60 the three phase bridge inverter 410 switches are arranged to apply a single voltage phase across each of the coil sub-sets 61, 62, 63.

Using PWM switching, the plurality of switches are arranged to apply an alternating voltage across the respective coil sub-sets. The voltage envelope and phase angle of the electrical signals is determined by the modulating voltage pulses.

Figure 6:
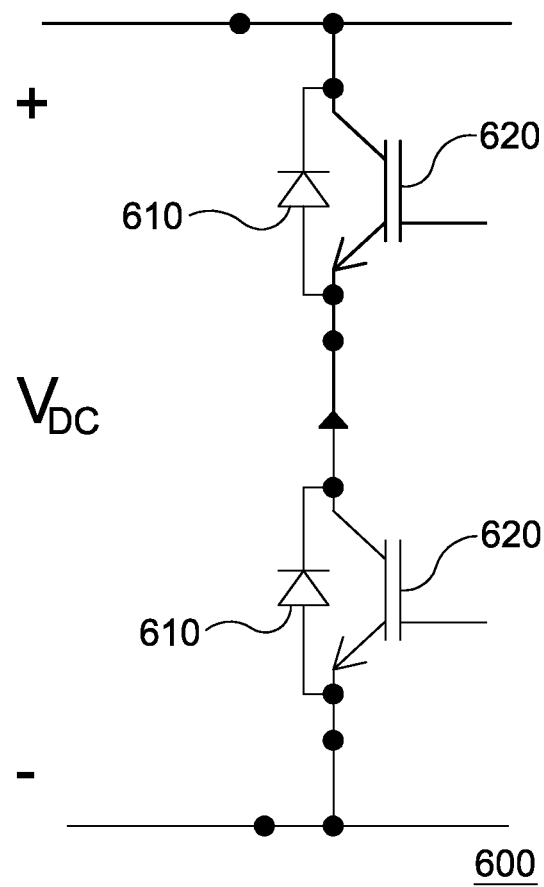
FIG. 6 illustrates a prior art inverter.

The inverter switches can include semiconductor devices such as MOSFETs or IGBTs. In the present example, the switches comprise IGBTs. However, any suitable known switching circuit can be employed for controlling the current. For a three phase inverter having six switches configured to drive a three phase electric motor, the six switches are configured as three parallel sets of two switches, where each pair of switches is placed in series and form a leg 600 of the three phase bridge circuit to form a three phase bridge inverter configuration. A fly-back diode 610, otherwise known as a reverse diode, is coupled in anti-parallel across each switch 620, as illustrated in FIG. 6. A single phase inverter will have two pairs of switches 620 arranged in series to form two legs 600 of an inverter.

As stated above, each of the inverter legs 600 are electrically coupled between a pair of power source busbars.

As stated above, PWM switching is used to apply an alternating voltage to the electric motors coil windings, where the rotor speed is dependent upon the amplitude of the voltage applied across the coil windings, where the torque applied to the rotor results from drive current within the coil windings.

Should a fault occur in one of the inverter switches, causing it to short circuit, the remaining inverter switches will be unable to provide the correct alternating voltage to the coil windings, effectively causing the electric motor to become non-operational.

If a condition occurs that results in the electric motor becoming non-operational as a result of an inverter switch fault, the controllers within the respective control devices, or alternatively a single controller, are arranged to place the remaining operational inverter switches in one of two configurations.

In a first configuration, the controller is arranged, upon detection of a fault in one of the high side switches, to place the remaining high side switches in a closed circuit configuration and the plurality of low side switches in an open circuit configuration to allow coil windings of an electric motor to be placed in a short circuit configuration. In a second configuration, upon detection of a fault in one of the low side switches, the controller is arranged to place the remaining low side switches in a closed circuit configuration and the plurality of high side switches in an open circuit configuration to allow coil windings of an electric motor to be placed in a short circuit configuration.

To allow an inverter switch fault to be detected, preferably each inverter switch includes means for detecting a fault with the respective inverter switches, for example a fault that results in the switch remaining in a short circuit configuration. For the purposes of the present embodiment, the inverter switch drivers include desaturation fault detection circuitry to allow a short circuit failure for the respective switches to be identified. Although the present embodiment describes the use of desaturation fault detection circuitry to identify a short circuit failure for an inverter switch any suitable means may be used to identify a short circuit event.

Alternatively, separate fault detection circuitry may be used. For example, desaturation fault detection circuitry may be associated with the high side inverter switches and the low side inverter switches for determining whether a fault has occurred on any one of the high side or low side inverter switches without identifying which specific inverter switch has failed. Similarly, the desaturation fault detection circuitry may be configured to merely identify that an inverter switch has occurred without identifying whether the fault is associated with the high side or low side switches.

Figure 7:
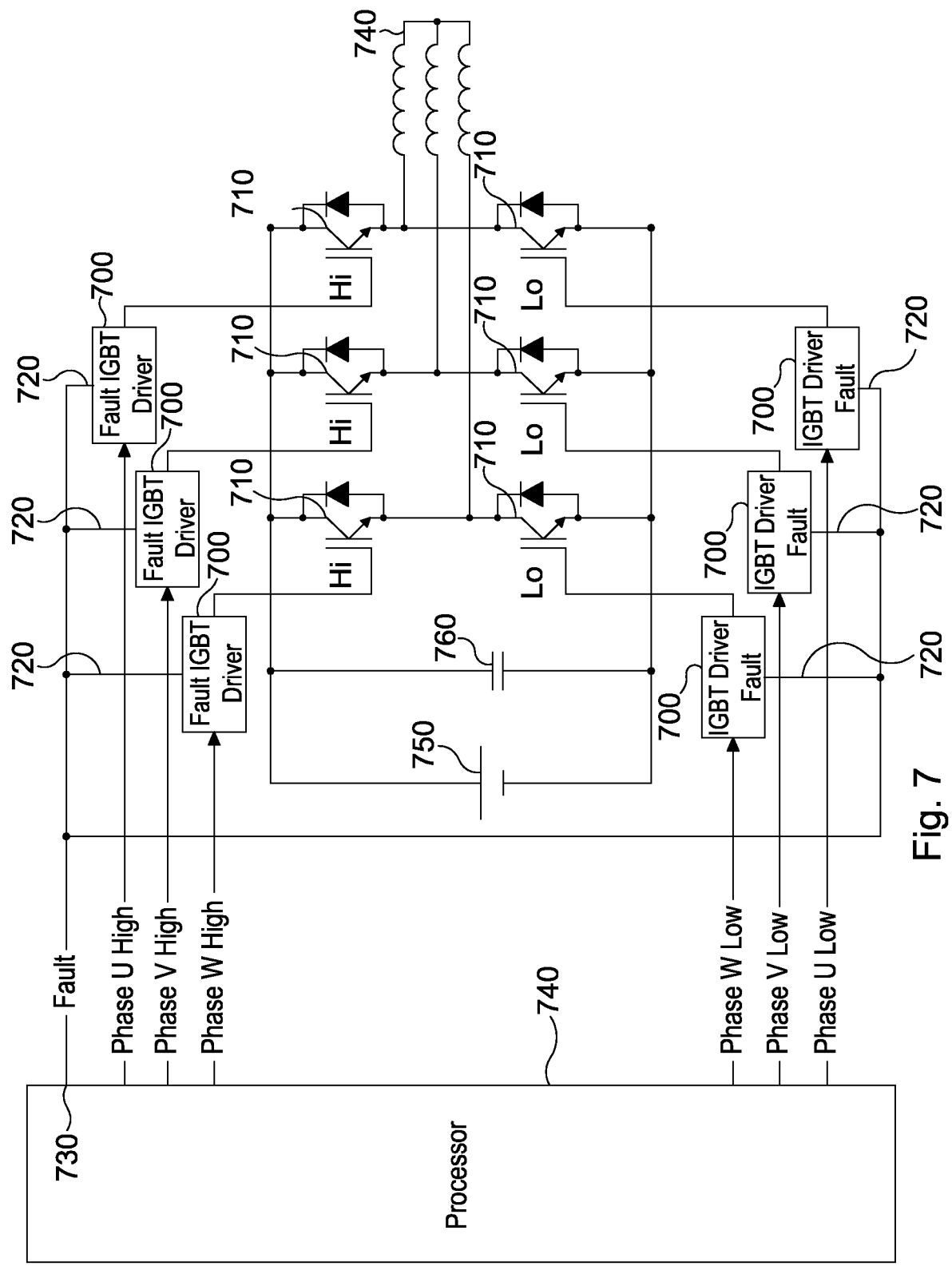
FIG. 7 illustrates an inverter fault detection circuit according to a first embodiment of the present invention.

FIG. 7 illustrates a first embodiment of a fault detection circuit, where drivers 700 for the respective three phase bridge inverter switches 710 include a separate fault line 720 that are coupled to a common fault detection input 730 of a processor 740 within the control device.

As described above, the control device processor 740 sends control signalling to the respective drivers 700 for operating the inverter switches 710 to provide PWM voltage control across the coil windings 790, where the high side switches are directly connected to the positive terminal of a battery 750, with the low side switches being directly connected to the negative terminal of the battery 750. A capacitor 760 is coupled across the inverter.

Upon any one of the drivers 700 detecting a desaturation fault with their respective inverter switch 710, the driver signals this to the control device processor 740. A mechanism for allowing the control device to determine whether the fault relates to a high side or low side switch is described below.

Figure 8:
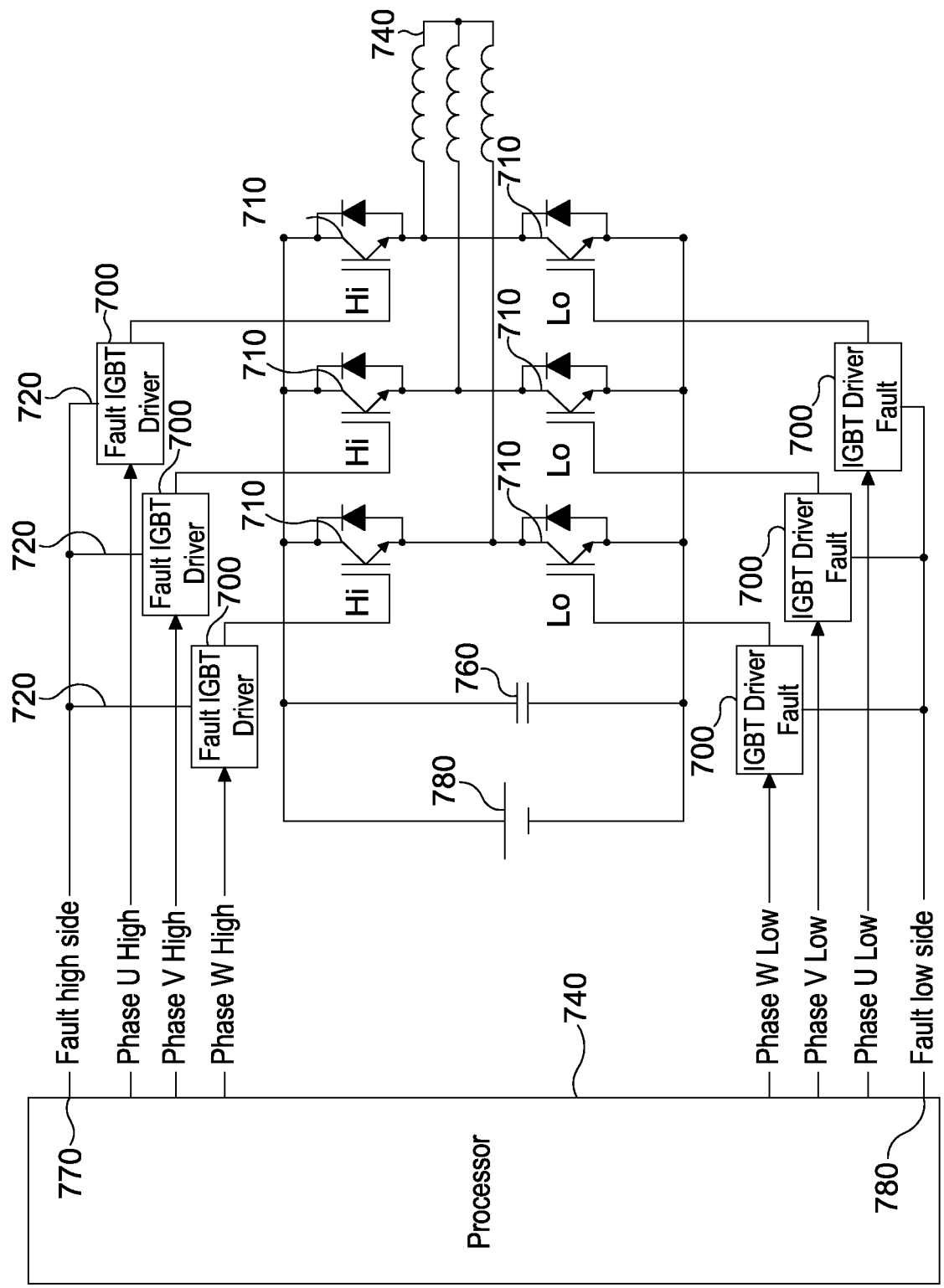
FIG. 8 illustrates an inverter fault detection circuit according to a second embodiment of the present invention.

FIG. 8 illustrates a second embodiment of a fault detection circuit, where drivers 700 for the high side three phase bridge inverter switches 710 include a separate fault line that are coupled to a first fault detection input 770 of a processor 740 within the control device and the drivers 700 for the low side three phase bridge inverter switches 710 include a separate fault line that are coupled to a second fault detection input 780 of the processor 740 within the control device. For ease of reference, the same elements in FIG. 8 to those in FIG. 7 have been provided with the same reference numerals.

Upon any one of the high side inverter switch drivers 700 detecting a desaturation fault with their respective inverter switch 710, the driver signals this, which is communicated to the first fault detection input 770 of the control device processor 740, thereby allowing the control device to determine that the switch fault relates to a high side inverter switch.

Upon any one of the low side inverter switch drivers 700 detecting a desaturation fault with their respective inverter switch 710, the driver signals this, which is communicated to the second fault detection input 780 of the control device processor 740, thereby allowing the control device to determine that the switch fault relates to a low side inverter switch.

Upon an inverter switch fault being identified that results in an inverter switch going short circuit, the remaining inverter switches 710 are placed in a configuration that results in the short circuiting of the electric motor coil windings, as described above, thereby preventing voltage resulting from the back emf generated by the electric motors being placed on the power source busbars.

Figure 9:
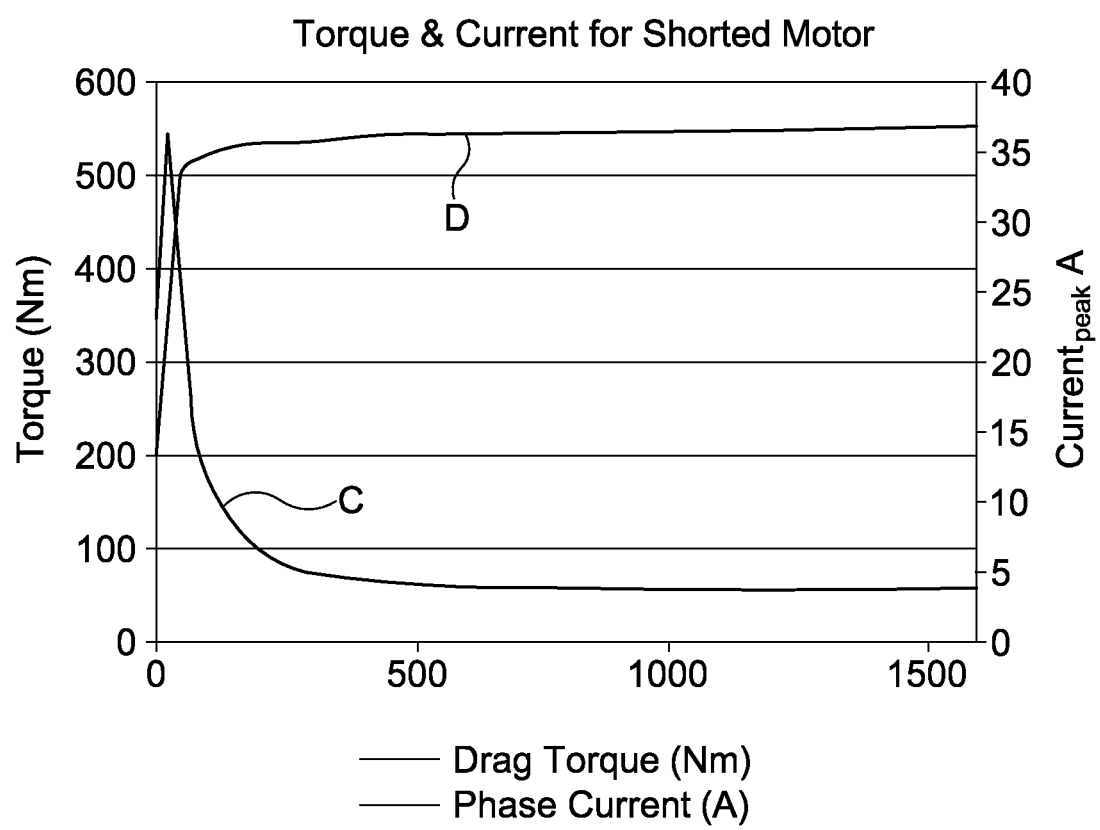
FIG. 9 illustrates a drag torque graph.

FIG. 9 illustrates an example of the variation in drag torque, line C, and electric motor generated current, line D, versus angular rotational speed of the rotor when the electric motor inverters are placed in a short circuit configuration.

As can be seen in FIG. 9, at low rotor velocities current flowing through the electric motors coil windings create a drag torque, which reduces as the rotor velocity increases as a result of increased impedance.

Preferably, to avoid the electric motor experiencing high drag torque upon an inverter switch short circuit fault occurring at low speeds, the controller is arranged to only place the coil windings of an electric motor in a short circuit configuration upon detection of a fault in one of the switches if a rotor of the electric motor is rotating above a predetermined velocity.

For an embodiment in which the desaturation fault detection circuitry is configured to merely identify that an inverter switch has occurred without identify whether the fault is associated with the high side or low side switches, the controller is arranged to identify whether the fault has occurred to a high or low side inverter switch by alternatively closing the high and low side inverter switches to place the coil windings of the electric motor in a short circuit configuration while the controller determines as to whether the desaturation fault detection circuitry is still identifying an inverter switch fault.

For example, initially the controller is configured, upon identification of a desaturation fault, to place the high side switches in a closed circuit configuration and the plurality of low side switches in an open circuit configuration. A determination is then made as to whether the desaturation fault is still being detected. If the desaturation fault is still being detected this is indicative of the fault being associated with one of the low side switches. In this scenario the controller is arranged to place the low side switches in a close circuit configuration and the plurality of high side switches in an open circuit configuration with the controller making a further determination as to whether the fault is still detected.

The controller can be configured to initially place either the high side inverter switches in a close circuit configuration or the low side inverter switches.

For example, in a first embodiment, the controller initially places the high side switches in a closed circuit configuration and the plurality of low side switches in an open circuit configuration upon detection by the desaturation detector of a desaturation fault associated with one of the switches. Once the inverter switches are placed in their respective closed and open circuit configuration a determination is made as to whether the desaturation fault is still detected by the desaturation detector. If so, the controller is arranged to place the low side switches in a closed circuit configuration and the plurality of high side switches in an open circuit configuration to allow coil windings of an electric motor to be placed in a short circuit configuration.

In a second embodiment, the controller initially places the low side switches in a closed circuit configuration and the plurality of high side switches in an open circuit configuration upon detection by the desaturation detector of a desaturation fault associated with one of the switches. Once the inverter switches are placed in their respective closed and open circuit configuration a determination is made as to whether the desaturation fault is still detected by the desaturation detector. If so, the controller is arranged to place the high side switches in a closed circuit configuration and the plurality of low side switches in an open circuit configuration to allow coil windings of an electric motor to be placed in a short circuit configuration.

The invention claimed is:

1. A controller for an electric motor system including a multi phase bridge inverter having a plurality of high side switches and a plurality of low side switches, the controller comprising:
   a fault detection circuitry configured to:
      upon detection of a fault in one of the high side switches, place the remaining high side switches in a closed circuit configuration and the plurality of low side switches in an open circuit configuration while the fault on one of the high side switches is detected; and
      upon detection of a fault in one of the low side switches, place the remaining low side switches in a closed circuit configuration and the plurality of high side switches in an open circuit configuration, while the fault on one of the low side switches is detected to place coil windings of an electric motor in a short circuit configuration;
   wherein the high side switches and the low side switches are placed in a configuration to allow the coil windings of the electric motor to be placed in a short circuit configuration upon detection of a fault in one of the high side switches or one of the low side switches if a rotor of the electric motor is rotating above a predetermined velocity.

2. A controller according to claim 1, wherein the fault in one of the high side or low side switches is a short circuit fault.

3. A controller according to claim 1, wherein the fault in one of the high side or low side switches is detected by a separate desaturation detector, within the fault detection circuitry, associated with one of the high side or low side switches.

4. A controller according to claim 1, wherein the fault detection circuitry is further configured to:
   locate the fault by placing the high side switches in a closed circuit configuration and the plurality of low side switches in an open circuit configuration upon detection of a fault associated with one of the high side switches or one of the low side switches;
   determine whether the fault is still detected, or place the low side switches in a closed circuit configuration and the plurality of high side switches in an open circuit configuration upon detection of the fault associated with one of the high side switches or one of the low side switches; and determine whether the fault is still detected.

5. A method of controlling an electric motor system including a multi phase bridge inverter having a plurality of high side switches and a plurality of low side switches and a desaturation detector, the method comprising:

placing the high side switches in a closed circuit configuration and the plurality of low side switches in an open circuit configuration upon detection by the desaturation detector of a desaturation fault associated with one of the high side switches or one of the low side switches;

determining whether the desaturation fault is still detected by the desaturation detector; and when the desaturation fault is still detected by the desaturation detector, placing the low side switches in a closed circuit configuration and the plurality of high side switches in an open circuit configuration to allow coil windings of an electric motor to be placed in a short circuit configuration, wherein the high side switches and the low side switches are placed in a configuration to allow the coil windings of the electric motor to be placed in a short circuit configuration upon detection of a fault in one of the high side switches or one of the low side switches if a rotor of the electric motor is rotating above a predetermined velocity.

6. A method of controlling an electric motor system including a multi phase bridge inverter having a plurality of high side switches and a plurality of low side switches and a desaturation detector, the method comprising:

placing the low side switches in a closed circuit configuration and the plurality of high side switches in an open circuit configuration upon detection by the desaturation detector of a desaturation fault associated with one of the high side switches or one of the low side switches;

determining whether the desaturation fault is still detected by the desaturation detector; and when the desaturation fault is still detected by the desaturation detector, placing the high side switches in a closed circuit configuration and the plurality of low side switches in an open circuit configuration to allow coil windings of an electric motor to be placed in a short circuit configuration, wherein the high side switches and the low side switches are placed in a configuration to allow the coil windings of the electric motor to be placed in a short circuit configuration upon detection of a fault in one of the high side switches or one of the low side switches if a rotor of the electric motor is rotating above a predetermined velocity.

* * * * *